United States Patent [19]
Melot et al.

[11] Patent Number: 5,998,545
[45] Date of Patent: Dec. 7, 1999

[54] MIXTURES OF POLYMER HAVING POLYAMIDE BLOCKS AND COPOLYMERS HAVING VINYLAROMATIC UNITS AND ANHYDRIDE UNITS

[75] Inventors: Denis Melot; Alain Bouilloux, both of Bernay; Benoit Ernst, Beaumont-le-Roger, all of France

[73] Assignee: Elf Atochem S.A., Paris, France

[21] Appl. No.: 09/010,846

[22] Filed: Jan. 22, 1998

[30] Foreign Application Priority Data

Jan. 22, 1997 [FR] France .................................. 97 00636

[51] Int. Cl.$^6$ ...................................................... C08L 77/00
[52] U.S. Cl. ........................... 525/178; 528/170; 528/310; 528/323; 528/328; 525/66; 525/179; 525/183; 525/408; 525/420; 525/430; 525/432
[58] Field of Search ...................... 528/323, 310, 528/328, 170; 525/66, 178, 179, 183, 408, 420, 430, 432

[56] References Cited

U.S. PATENT DOCUMENTS

| | | | |
|---|---|---|---|
| 4,115,475 | 9/1978 | Foy et al. | 525/408 |
| 4,167,505 | 9/1979 | Dunkelberger | 528/310 |
| 4,195,015 | 3/1980 | Deleens et al. | 528/328 |
| 4,230,838 | 10/1980 | Foy et al. | 525/408 |
| 4,331,786 | 5/1982 | Foy et al. | 525/408 |
| 4,332,920 | 6/1982 | Foy et al. | 525/408 |
| 4,839,441 | 6/1989 | Cuzin et al. | 528/328 |
| 4,864,019 | 9/1989 | Cuzin et al. | 528/279 |
| 4,966,941 | 10/1990 | Subramanian | 525/66 |
| 5,122,570 | 6/1992 | Subramanian | 525/66 |
| 5,126,407 | 6/1992 | Subramanian | 525/66 |

FOREIGN PATENT DOCUMENTS

| | | |
|---|---|---|
| 003126 | 7/1979 | European Pat. Off. . |
| 624623 A1 | 11/1994 | European Pat. Off. . |
| 688826 A1 | 12/1995 | European Pat. Off. . |
| 737709 A1 | 10/1996 | European Pat. Off. . |
| 58-117250 | 7/1983 | Japan . |
| 60-023435 | 2/1985 | Japan . |
| 61-051049 | 3/1986 | Japan . |

OTHER PUBLICATIONS

French Search Report dated Oct. 7, 1997.

Primary Examiner—P. Hampton-Hightower
Attorney, Agent, or Firm—Bell, Boyd & Lloyd

[57] ABSTRACT

The present invention relates to a mixture of polymers (A) having polyamide blocks and copolymers (B) comprising vinylaromatic units and unsaturated carboxylic anhydride units, the quantity of (B) being sufficient for the melt index (or melt flow index, MFI) of the mixture of (A) and (B) to be less than the melt index of (A) alone.

It also relates to masterbatches of (A) and (B).

8 Claims, No Drawings

MIXTURES OF POLYMER HAVING POLYAMIDE BLOCKS AND COPOLYMERS HAVING VINYLAROMATIC UNITS AND ANHYDRIDE UNITS

FIELD OF THE INVENTION

The present invention relates to mixtures of polymers (A) having polyamide blocks and copolymers having vinylaromatic units and carboxylic anhydride units. It relates more particularly to polymers made up of polyamide blocks and polyether blocks. These polymers are sometimes too fluid in the course of their extrusion; the Applicant has discovered that the addition of a few per cent of styrene-maleic anhydride (SMA) copolymer makes it possible to control the viscosity and the melt strength.

The Applicant has also discovered that, for greater proportions of SMA, there is a drop in viscosity, which makes it possible to prepare masterbatchebs of polymers having polyamide blocks and polyether blocks with SMA. All that is then required is to add these masterbatches to the polymer having polyamide blocks and polyether blocks in order to obtain polymers of controlled viscosity.

BACKGROUND OF THE INVENTION

The prior art U.S. Pat. No. 5,126,407 describes mixtures comprising:

from 85 to 65 parts of polyamide 6.6;
from 15 to 30 parts of a copolymer of ethylene and acrylic acid in the proportions 90/10, which is neutralized 70% with zinc;
from 0.1 to 3 parts of a styrene-maleic anhydride copolymer.

The comparative examples show that the presence of the styrene-maleic anhydride copolymer is necessary in order to give a sufficient melt strength and to allow blow moulding of the alloys of the PA 6.6 and of the neutralized ethylene-acrylic acid copolymer and their conversion into hollow bodies.

U.S. Pat. No. 5,122,570 is similar to the abovementioned prior art except that the neutralized ethylene-acrylic acid copolymer is replaced by a mixture of polyethylene and grafted polyethylene.

U.S. Pat. No. 4,966,941 describes mixtures comprising:
from 90 to 65 parts of polyamide 6.6
from 10 to 30 parts either of an ethylene-acrylic acid copolymer which is neutralized to 70% with zinc or of a mixture of polyethylene and grafted polyethylene
from 0.1 to 3 parts of a styrene-maleic anhydride copolymer
from 0.1 to 30 parts of fibres of a fluoropolymer.

The comparative examples show that the presence of the styrene-maleic anhydride copolymer and of the fluoropolymer fibres is required to enable the alloys of the polyamide with either the neutralized ethylene-acrylic acid copolymer or the polyethylene and the grafted polyethylene to be blow moulded and converted into hollow bodies.

EP 624 623 describes films made up of a mixture of 45 parts of a styrene-maleic anhydride copolymer of mass $\overline{Mw}$ 110,000, which is optionally imidized, and 55 parts of a copolymer having polyamide blocks and polyether blocks. These films withstand repeated folding.

The prior art has not described the technical problem of the present invention.

DESCRIPTION OF THE INVENTION

The present invention relates to mixtures of polymers (A) having polyamide blocks and copolymers (B) comprising vinylaromatic units and carboxylic anhydride units, the quantity of (B) being sufficient for the melt index (or melt flow index, MFI) of the mixture of (A) and (B) to be less than the melt index of (A) alone.

The quantities of (B) depend on the nature of (A) and on the anhydride functions of (B); by way of example, the quantity of (B) can be from 1 to 5 parts (by weight) to, respectively, from 99 to 95 parts of (A). (Unless indicated otherwise, in the remainder of the text, the parts are by weight.)

The present invention also relates to a process for preparing these mixtures of (A) and (B), which consists in adding a masterbatch of (A) and (B), i.e. a mixture rich in (B), to (A). The invention also relates to these masterbatches. The Applicant has discovered that, by adding the copolymer (B) to the polymer (A) in small amounts, a drop in the melt index, and a melt strength, are observed which allow the polymer (A) to be extruded and shaped and that, by continuing to add the copolymer (B), the reverse effect is observed, i.e. there is a further increase in the melt index.

Another advantage of the invention is that the transparency of the polymer (A) is not altered by the presence of (B), and the polymers having polyamide blocks (A) can contain polyester blocks, polyether blocks, etc. The invention relates in particular to polymers having polyamide blocks and polyether blocks.

The polymers having polyamide blocks and polyether blocks result from the copolycondensation of polyamide sequences having reactive ends with polyether sequences having reactive ends, such as, inter alia:

1) Polyamide sequences having diamine chain ends with polyoxyalkylene sequences having dicarboxylic chain ends.
2) Polyamide sequences having dicarboxylic chain ends with polyoxyalkylene sequences having diamine chain ends, obtained by cyanoethylation and hydrogenation of aliphatic, alpha,omega-dihydroxylated polyoxyalkylene sequences, which are called polyetherdiols.
3) Polyamide sequences having dicarboxylic chain ends with polyetherdiols, the products obtained being, in this particular case, polyetheresteramides.

The polyamide sequences having dicarboxylic chain ends originate, for example, from the condensation of alpha, omega-aminocarboxylic acids, lactams or dicarboxylic acids and diamines in the presence of a chain-limiting dicarboxylic acid. Advantageously, the polyamide blocks are of polyamide 12 or of polyamide 6.

The number-average molar mass $\overline{Mn}$ of the polyamide sequences is between 300 and 15,000 and preferably between 600 and 5000. The mass $\overline{Mn}$ of the polyether sequences is between 100 and 6000 and preferably between 200 and 3000.

The polymers having polyamide blocks and polyether blocks can also comprise units distributed randomly. These polymers can be prepared by the simultaneous reaction of the polyether and of the precursors of the polyamide blocks.

It is possible, for example, to react the polyetherdiol, a lactam (or an alpha,omega-amino acid) and a chain-limiting diacid in the presence of a small amount of water. A polymer is obtained having essentially polyether blocks and polyamide blocks whose length is highly variable; however, the various reactants have also reacted randomly and so are distributed statistically along the polymer chain.

These polymers having polyamide blocks and polyether blocks, whether they originate from the copolycondensation of polyamide sequences and polyethers prepared beforehand or from a single-stage reaction, possess, for example, Shore D hardnesses which can be between 20 and 75 and advantageously between 30 and 70 and an intrinsic viscosity of between 0.8 and 2.5 as measured in meta-cresol at 250° C. for an initial concentration of 0.8 g/100 ml.

Whether the polyether blocks derive from polyethylene glycol, from polyoxypropylene glycol or from polyoxytetramethylene glycol they are either used as such and subjected to copolycondensation with polyamide blocks having carboxylic ends or they are aminated to convert them to polyetherdiamines and are subjected to condensation with polyamide blocks having carboxylic ends. They can also be mixed with polyamide precursors anid a chain-limiting agent in order to make polymers having polyamide blocks and polyether blocks with units distributed statistically.

Polymers having polyamide and polyether blocks are described in the Patents U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920.

The polyether can be, for example, a polyethylene glycol (PEG), a polypropylene glycol (PPG) or a polytetramethylene glycol (PTMG). The latter is also referred to as polytetrahydrofuran (PTHF).

Whether the polyether blocks are in the chain of the polymer having polyamide blocks and polyether blocks in the form of diols or diamines, they are referred to simply as PEG blocks or PPG blocks or else PTMG blocks.

It would not be outside the scope of the invention if the polyether blocks contained two or more different units, such as units derived from ethylene glycol, from propylene glycol or else from tetramethylene glycol.

Preferably, the polymer having polyamide blocks and polyether blocks comprises a single type of polyamide block and a single type of polyether block. Use is made advantageously of polymers having PA12 blocks and polymers having PA6 blocks.

It is also possible to use a mixture of two or more polymers having polyamide blocks and polyether blocks.

Advantageously, the polymer having polyamide blocks and polyether blocks is such that the polyamide is the majority constituent by weight, i.e. the quantity of polyamide which is in the form of blocks and that which is optionally distributed statistically in the chain represents 50% by weight or more of the polymer having polyamide blocks and polyether blocks. Advantageously, the quantity of polyamide and the quantity of polyether are in a ratio (polyamide/polyether) of from 1/1 to 3/1.

Examples of vinylaromatic compounds are styrene, alpha-methylstyrene and aromatic ring-substituted styrene derivatives. These substituents can be halogens and alkyl groups having from 1 to 8 carbon atoms. Examples of possible substituted vinylaromatic compounds are p-methylstyrene, ethylstyrene, p-t-butylstyrene, o-chlorostyrene and p-chlorostyrene.

The copolymer (B) may comprise various vinylaromatic compounds. The unsaturated carboxylic anhydride can be chosen from maleic, itaconic, citraconic, methylmaleic and chloromaleic anhydrides. The anhydride functions can be partly or totally esterified by an alcohol, neutralized by a base or imidized by an amine, ammonia or aniline.

Advantageously, the weight-average molar mass $\overline{Mw}$ of the copolymer (B) is less than 10,000 and preferably between 1000 and 5000. This ratio of the quantity of vinylaromatic monomer to the quantity of anhydride is in molar terms advantageously between 0.5 and 5 and preferably between 1 and 3.

Particularly preferred copolymers (B) are the styrene-maleic anhydride (SMA) copolymers of formula:

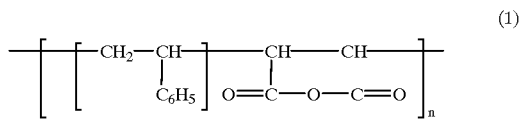

(1)

in which m is 1, 2 or 3 and n is 6, 7 or 8. The SMAs can be partially esterified.

The quantity of the copolymer (B) can be between 1 and 8 parts (by weight) to, respectively, from 99 to 92 parts of the polymer (A) and preferably 1 to 3 parts.

The present invention is particularly useful for lowering the melt index of polymers (A) having polyamide 12 blocks and PTMG blocks, polymers (A) having polyamide 6 blocks and PTMG blocks, polymers (A) having PA 6 blocks and PEG blocks, and polymers (A) having PA 12 blocks and PEG blocks.

All that is required is to add the copolymer (B) to the polymer (A) and to make a dry mixture before extruding it. However, it is much more simple to add a masterbatch of (A) and (B) to (A). The present invention additionally relates to these masterbatches. The Applicant has in fact discovered that there exists a value, or more precisely a range, above which the copolymer (B) has a fluidizing effect. This value or range is a function of the nature of (A) and (B). It is of the order of from 10 to 15 parts of (B) to from 90 to 85 parts of (A). Advantageously, the masterbatches of the invention comprise from 15 to 30 parts of the copolymer (B) and, respectively, from 85 to 70 parts of the polymer (A).

Masterbatches particularly preferred by the Applicant are those in which the polymer (A) has blocks of PA 6 or PA 12 and blocks of PTMG or PEG and the copolymer (B) is an SMA of formula (1).

The polymer (A) is modified in order to make it easier to use by adding to it the copolymer (B) in the form of the abovementioned masterbatch. It is sufficient to carry out the dry mixing of the granules of (A) and of the masterbatch of (A) and (B). The polymer (A) thus modified is extruded more easily and a better melt strength is observed and it is also easier to convert this melt to a film, whether by extrusion blow moulding of a bubble or by casting.

The present invention also relates to the modification of mixtures comprising polymers (A) and at least one polymer (C). These polymers (C) can be, for example, polyolefins, copolymers of ethylene and vinyl acetate or alkyl (meth) acrylate, SBS (styrene-butadiene-styrene) block copolymers and SIS (styrene-isoprene-styrene) block copolymers, it being possible for these block copolymers to be hydrogenated. These polymers (C) can also be functionalized by grafting or copolymerization. These mixtures advantageously comprise up to 50 parts of (C), preferably from 5 to 35 parts, to, respectively, from 95 to 65 parts of (A). Such mixtures are described in EP 688 826 and EP 737 709.

An increase in pressure has been observed during the extrusion of tubes of polymer (A) modified by (B) as compared with the extrusion of tubes of polymer (A) alone.

Good stability has also been observed when films consisting of (A) and (C) and comprising from 1 to 3% of (B) are extruded. The presence of (B) prevents, in particular, the instability of the film on the edges of the rollers of casting machines, this instability being manifested in sinusoidal shifting of the film (waving). The mixtures of polymers (A) and (B) or (A), (B) and (C) may contain additives such as antioxidants, UV absorbers, lubricants, flame retardants and fillers.

EXAMPLES

The following products were used:

PEBAX 1: polymer having PA6 blocks of mass $\overline{Mn}$ =2600 and PTMG blocks of mass $\overline{Mn}$ 650 and a Shore D hardness of 63.

PEBAX 2: polymer having PA12 blocks of mass $\overline{Mn}$ 4000 and PTMG blocks of mass $\overline{Mn}$ 1000 and a Shore D hardness of 63.

PEBAX 3: polymer having PA6 blocks of mass $\overline{Mn}$ 1000 and PTMG blocks of mass $\overline{Mn}$ 1000 and a Shore D hardness of 40.

PEBAX 4: polymer having PA6 blocks of mass $\overline{Mn}$ 1300 and PTMG blocks of mass $\overline{Mn}$ 650 and a Shore D hardness of 55.

SMA 2 denotes a partly esterified styrene-maleic anhydride copolymer. It is defined in Table 6.

MB 20% SMA 2 denotes a masterbatch comprising 20 parts by weight of SMA 2 and 80 parts of PEBAX 3. It is produced on a BUSS machine with a length of 15 D at 35 rpm in accordance with the following temperature profile: 210-215-220-205-205.

Tables 1 to 3 relate to the effect of the proportion of SMA 2 on the MFI (235° C., 1 kg, diameter 2 mm; ASTM D 1238) of PEBAX 1, 2 and 3. The various samples were produced by dry mixing the PEBAX with the SMA in its powder form and then introducing these mixtures into a LEISTRITZ extruder with a screw length of 34 D at 75 rpm with the following temperature profile: 220-210-210-205-200-200-200-200-200.

In these tables, C. Variation signifies the standard deviation of the measurement, and Humidity % signifies the moisture content of the granules, as measured by the Karl Fischer method.

TABLE 1

| PEBAX 1 (% by weight) | SMA 2 (% by weight) | MFI (g/10 min) | C. Variation | Humidity (%) |
|---|---|---|---|---|
| 100 | 0 | 8.39 | 1 | 0.033 |
| 99 | 1 | 4.62 | 0.6 | 0.028 |
| 97 | 3 | 4.17 | 1.8 | 0.028 |
| 95 | 5 | 4.09 | 0.8 | 0.031 |
| 92.9 | 7.1 | 4.21 | 0.6 | 0.022 |
| 90.2 | 9.8 | 5.46 | | 0.039 |

TABLE 2

| PEBAX 2 (% by weight) | SMA 2 (% by weight) | MFI (g/10 min) | C. Variation | Humidity (%) |
|---|---|---|---|---|
| 100 | 0 | 5.31 | 0.9 | 0.019 |
| 99 | 1 | 4.29 | 0.3 | 0.025 |
| 97 | 3 | 4.65 | 0.7 | 0.023 |
| 95 | 5 | 5.23 | 0.3 | 0.027 |
| 92.7 | 7.3 | 6.33 | 2.2 | 0.035 |
| 90 | 10 | 7.84 | 2.5 | 0.032 |

TABLE 3

| PEBAX 3 (% by weight) | SHA 2 (% by weight) | MFI (g/10 min) | C. Variation | Humidity (%) |
|---|---|---|---|---|
| 100 | 0 | 10.66 | 1.1 | |
| 98.9 | 1.1 | 6.94 | 0.8 | 0.059 |
| 97.2 | 2.8 | 6.48 | 1.4 | |
| 94.4 | 5.6 | 7.38 | 0.3 | 0.059 |
| 92.8 | 7.2 | 9.74 | 0.8 | |
| 90.1 | 9.9 | 10.57 | 2.4 | |

These MFI results demonstrate the viscosifying effect of the SMA on various grades of PEBAX for very small amounts of between 1 and 3% by weight. Moreover, above an introduced amount of 5%, we note a fluidizing effect of the SMA on the melt viscosity of the PEBAXs. This is an important point, since it is this which allows us subsequently to produce PEBAX-SMA masterbatches which are easy to redisperse in the PEBAX matrix by dry blending at the compounding stage or at the time of use.

Tables 4 and 5 illustrate the use of an SMA-based masterbatch for modifying the melt rheology of PEBAX. The masterbatch is introduced into the PEBAX by dry mixing and then the resulting mixture is extruded on the same LEITSTRITZ with the same profile as in Tables 1 to 3.

The MFI is measured as in Tables 1–3.

TABLE 4

| PEBAX 4 (% by weight) | MB 20% SMA 2 | MFI (g/10 min) | C.Variation (%) | Humidity (%) |
|---|---|---|---|---|
| 100 | — | 12.89 | 0.6 | |
| 95 | 5 | 7.43 | 0.7 | 0.059 |
| — | 100 | 28.76 | 0.1 | 0.06 |

TABLE 5

| PEBAX 1 (%) | MB 20 % SMA 2 | MFI (g/10 min) | C.Variation (%) | Humidity (%) |
|---|---|---|---|---|
| 100 | — | 9.5 | 0.7 | 0.02 |
| 95 | 5 | 5.09 | 0.5 | 0.05 |
| — | 100 | 12.28 | 0.11 | 0.06 |

Table 7 compares the efficacy of various grades, both esterified and non-esterified, of SMA, and of varying molecular mass (the characteristics of which SMA grades are reported in Table 6) on the rheology of PEBAX 4. It may also be noted that high molecular masses do not make it possible to obtain desired properties, in particular in terms of transparency.

The SMAs are introduced either pure or in the form of masterbatches dry-blended with the PEBAX and then extruded on a Brabender ZSK.

TABLE 6

Types of SMA used

| | $Mn^{(1)}$ | $Tf(° C.)^{(2)}$ | $Tf(° C.)^{(2)}$ | Acid number[3] | % $MA^{(3)}$ | % esterified[3] |
|---|---|---|---|---|---|---|
| SMA1 | 1700 | 140–160 | | 124 | 335–375 | 33.5 |
| SMA2 | 1900 | 135–150 | | 110 | 232 | 13.6 | 53 |
| SMA3 | 49000 | 218–288 | | | | $7.1^{(4)}$ | |

[1]Measured by GPC in polystyrene equivalents
[2]Measured by DSC
[3]Measured by method ATO8130 (potentiometry)
[4]Measured by potentiometry

TABLE 7

Comparison of various grades of SMA on the rheology and transparency of PEBAX 4.

| PEBAX 4 | % MBSMA2 (3) | % MBSMA1 (3) | % SMA3 (4) | MFI (5) | Transparency (6) | Opacity index (7) |
|---|---|---|---|---|---|---|
| 100(1) | | | | 7.59 | 16.2 | |
| 95(1) | 5 | | | 4.35 | 16.25 | |
| 85(1) | 15 | | | 5.89 | 19 | |
| (1) | 100 | | | 23.45 | 19 | |
| 95(1) | | 5 | | 5.31 | 16.2 | 25 |
| 85(1) | | 15 | | 6.47 | 18.6 | 25 |
| (1) | | 100 | | 24.70 | 18.2 | 25 |
| 100(2) | | | | 6.27 | 14.3 | 25 |
| 90(2) | | | 10 | 4.8 | * | 80 |
| 80(2) | | | 20 | 3.2 | * | 90 |

(1)Mixtures produced on Brabender ZSK; temperature profile: 180-200-200; screw speed: 60 rpm
(2)Mixtures produced on Brabender ZSK; temperature profile: 230-240-250; screw speed: 60 rpm
(3)Masterbatch containing 20% of SMA, produced on a Buss 15D; screw speed: 35 rpm; temperature profile: 210-215-220-205-205
(4)Pure SMA introduced by dry blending
(5)Melt flow index g/10 min, 235° C. and 1 kg; diameter 2 mm; ASTM D 1238
(6)% of light transmitted by 2 mm sheets at 560 nm; ASTM D 1003
(7)Elf Atochem in-house method; the higher the index, the more opaque the sample
*Opaque samples Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Mixtures of polymers (A) having polyamide blocks and whose number average molecular mass is between 300 and 15,000 and copolymers (B) comprising vinylaromatic units and whose weight average molar mass is between about 1000 and about 5000, the quantity of (B) being sufficient for the melt index (or melt flow index, MFI) of the mixture of (A) and (B) to be less than the melt index of (A) alone.

2. Mixtures according to claim 1, wherein the polymer (A) is a polymer having polyamide blocks and polyetherdiol blocks.

3. Mixtures according to claim 2, wherein the polyamide blocks of (A) are of polyamide 6 or of polyamide 12 and the polyether blocks are of polyethylene glycol (PEG) or polytetramethylene glycol (PTMG).

4. Mixtures according to claim 1, wherein (B) is a styrene-maleic anhydride copolymer which is optionally partly or totally esterified by an alcohol, neutralized by a base or imidized by an amine or ammonia.

5. Mixtures according to claim 1, wherein the quantity of (B) is from 1 to 8 parts to, respectively, from 99 to 92 parts of (A).

6. Mixtures according to claim 1, wherein there is also at least one polymer (C) selected from polyolefins, copolymers of ethylene and vinyl acetate or alkyl (meth)acrylate, SBS block copolymers and SIS block copolymers, optionally these block copolymers are hydrogenated and the polymer (C) to be functionalized by grafting or copolymerization.

7. Masterbatches of polymers (A) and copolymers (B), according to claim 1.

8. Masterbatches according to claim 7 comprising from 15 to 30 parts of (A) and from 85 to 70 parts of (B).

* * * * *